United States Patent [19]

Basrai

[11] 4,434,857
[45] Mar. 6, 1984

[54] TRACTOR AND IMPLEMENT COUPLED THERETO WITH HYDRAULIC LIFT SYSTEM INCLUDING PHASING VALVE

[75] Inventor: Habil S. Basrai, Port Huron, Mich.

[73] Assignee: Ford Motor Company, Dearborn, Mich.

[21] Appl. No.: 317,353

[22] Filed: Nov. 2, 1981

[51] Int. Cl.³ ............................................. A01B 63/22
[52] U.S. Cl. ..................................... 172/328; 91/171; 280/414.5
[58] Field of Search .................. 172/2, 3, 4, 7, 9, 128, 172/209, 210, 211, 327, 328, 396, 445, 458; 91/171, 515; 280/414.5

[56] References Cited

U.S. PATENT DOCUMENTS

| | | | |
|---|---|---|---|
| 3,575,241 | 4/1971 | McKeon et al. | 172/3 |
| 3,752,039 | 8/1973 | Hewins | 91/171 |
| 3,753,467 | 8/1973 | Wilson | 172/3 |
| 3,756,123 | 9/1973 | Howarth et al. | 91/171 |
| 4,006,664 | 2/1977 | Brown | 91/171 |
| 4,164,122 | 8/1979 | Ward | 91/171 X |
| 4,207,951 | 6/1980 | Wilcox et al. | 172/328 X |
| 4,325,400 | 4/1982 | Wynne | 91/515 X |

FOREIGN PATENT DOCUMENTS 1557749 4/1970 Fed. Rep. of Germany ...... 172/328
561535 5/1944 United Kingdom ................. 91/171

*Primary Examiner*—Richard T. Stouffer
*Attorney, Agent, or Firm*—John J. Roethel; Daniel M. Stock; Clifford L. Sadler

[57] ABSTRACT

In combination, a tractor having at its rear end an implement hitch and a lift system and an implement coupled at one end to the hitch and having at its other end a height adjusting system for controlling the working depth of the implement. The lift includes a first hydraulic cylinder and the height adjusting system includes a second or remote hydraulic cylinder. The tractor has a pump providing a source of fluid under pressure. An auxiliary services valve is in communication with the fluid source and a phasing valve, the two valves being selectively in communication with one another.

The auxiliary services valve is operable to independently actuate the first hydraulic cylinder to raise the hitch or to coact with the phasing valve to serially couple the second hydraulic cylinder to the first hydraulic cylinder to provide synchronous actuation of both cylinders to raise both ends of the implement to a fully raised position.

4 Claims, 7 Drawing Figures

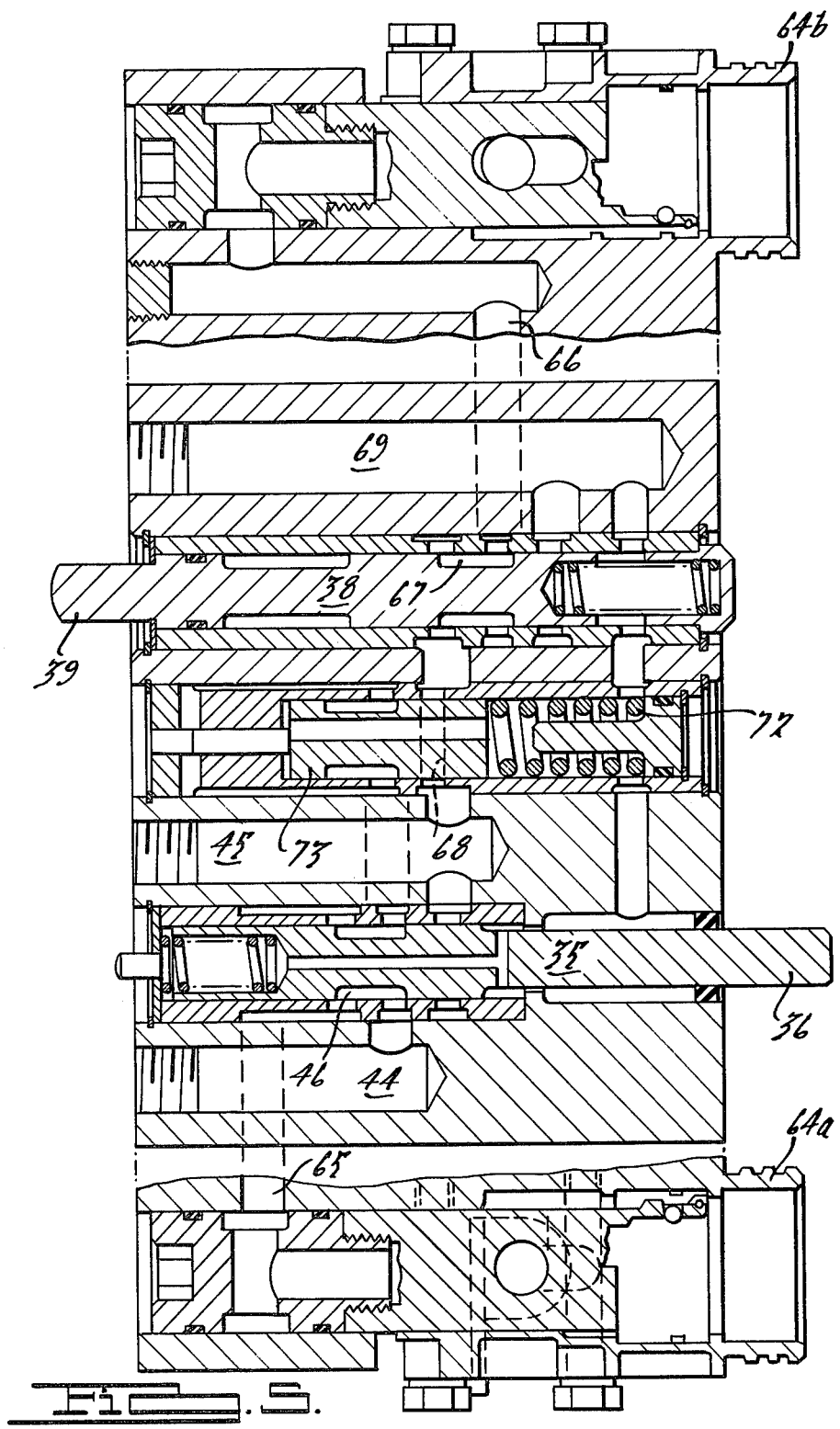

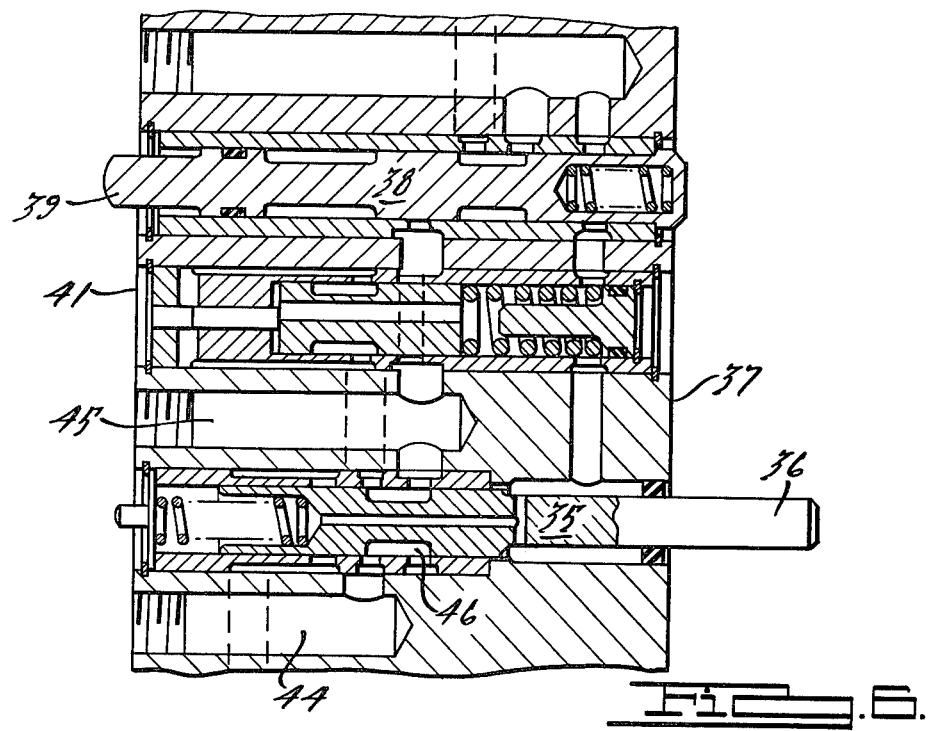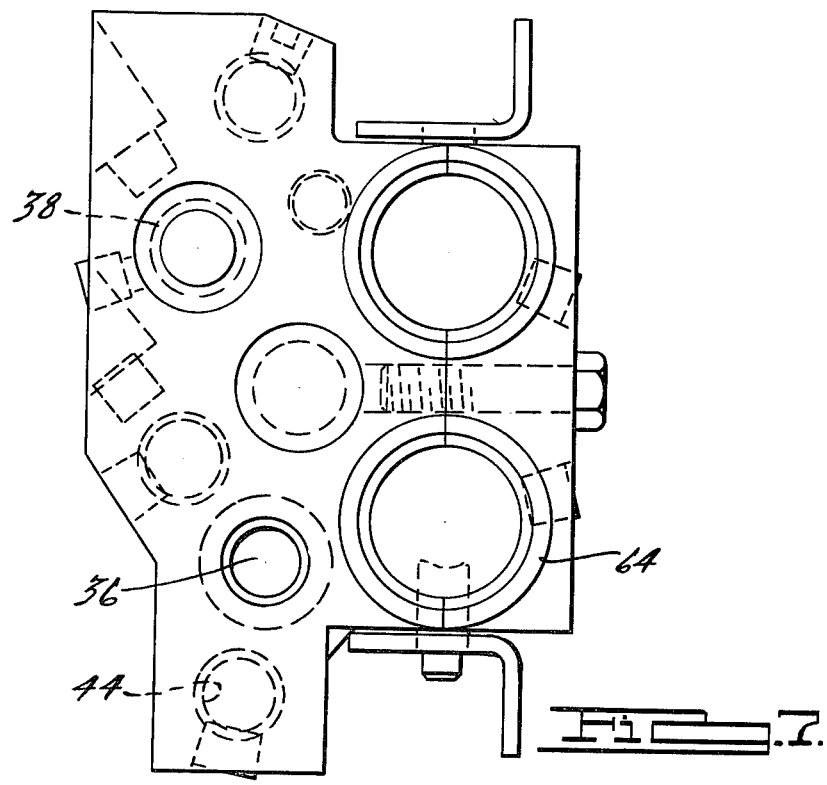

TRACTOR AND IMPLEMENT COUPLED THERETO WITH HYDRAULIC LIFT SYSTEM INCLUDING PHASING VALVE

BACKGROUND OF THE INVENTION AND PRIOR ART STATEMENT

This invention relates to tractor and implement hydraulic lift systems. A current draft control system for semi-mounted and trailed implements comprises an implement mouted remote cylinder that is connected in series with a tractor mounted hydraulic power lift cylinder for raising and lowering the tractor implement hitch. The coaction in the system is such that both cylinders extend and retract synchronously, raising and lowering both ends of the implement, front and rear, simultaneously.

Prior art patents of interest relative to the present invention are C. E. McKeon et al, U.S. Pat. No. 3,575,241, issued Apr. 20, 1971, for a "Tractor Hydraulic Lift Control System," and R. W. Wilson, U.S. Pat. No. 3,753,467, issued Aug. 21, 1973, for a "Tractor Implement Hydraulic Lift System."

The McKeon patent is directed to a tractor hydraulic lift system in which the height of the implement supporting hitch may be controlled responsive to driveline torque, a soil engaging implement mounted on the hitch being raised or lowered to maintain tractor driveline torque within selected predetermined limits. The Wilson patent carries the system a step further in that it discloses a system in which the hydraulic lift control of the tractor is utilized to regulate the height of a semi-mounted or trailed implement by regulating flow to and from a hydraulic cylinder mounted on the implement, thus also controlling the height of the implement responsive to tractor driveline torque.

When the operator of the tractor desires to use the draft control system, such as disclosed by Wilson, he must first engage an auxiliary services valve which directs pump oil to the remote cylinder. Return oil from the remote cylinder is directed to the hydraulic power lift cylinder, hence raising the implement by simultaneously extending both cylinders.

There are three major concerns with the known system which are detrimental to the farmer and the manufacturer of the equipment. First, the known system requires a complex sequence in which the controls must be operated to phase the remote cylinder with the hydraulic power lift cylinder for the initial and operational positioning of the earth working implement. Due to leakage of oil in either or both cylinders, the cylinders can become operationally out of phase. Second, the known system requires a unique remote cylinder which must be required to the customer with the tractor. This is because the remote cylinder in this system must match the volume of the hydraulic power lift cylinder. This unique remote cylinder contains a valve in the piston which opens at the end of the cylinder stroke to allow oil transfer to the hydraulic power lift cylinder. Third, the known system is susceptible to accidental overheating of the tractor hydraulic system in the event the operator disconnects the remote cylinder and forgets to shift the auxiliary service control valve to a position in which it continues to pump oil for the now non-existant remote cylinder, thus building up internal pressures in the tractor hydraulic system.

The present invention has as its objective a system that permits the use of any standard remote cylinder and automates the phasing and auxiliary service control valve functions.

SUMMARY OF THE INVENTION

The present invention relates to a tractor adapted to have a semi-mounted or trailed implement coupled to an implement hitch on the rear end of the tractor. A hydraulic lift means provides the hitch raising and lowering effort. The implement is coupled at its front end to the hitch and is supported at its rear end on a hydraulically adjustable height controlling device such as a gauge wheel for regulating the depth of penetration of the soil working device.

The hydraulically adjustable height control is obtained through a hydraulic cylinder that is connected in series with a hydraulic cylinder that is part of the hitch hydraulic lift system. Through the series connection, both cylinders extend and retract synchronously to raise and lower both ends of the implement.

The tractor hydraulic system has a pump that provides fluid under pressure to operate the hydraulic devices. Fluid under pressure flows through a phasing valve which is responsive to the position of a selected element of the hydraulic lift means for automatically phasing or placing in predetermined relationship both cylinders upon a full raise signal to the hydraulic lift means being initiated by the tractor operator. This ensures that the working depth of the implement will always be initiated from the same or initial starting place.

DESCRIPTION OF THE DRAWINGS

Further objects, features and advantages of the present invention will be made more apparent as this description proceeds, reference being had to the accompanying drawings, wherein:

FIG. 3 is a plan view of FIG. 2;

FIG. 5 is a diagrammatic illustration of an automatic phasing valve embodying the present invention;

FIG. 6 is an end elevation of the automatic phasing valve as seen from the right end as viewed in FIG. 5; and FIG. 7 is a partial view of FIG. 5 with the principal spool valves of the automatic phasing valve in operative positions different from those shown in FIG. 5.

DETAILED DESCRIPTION OF THE INVENTION

Figure 1:
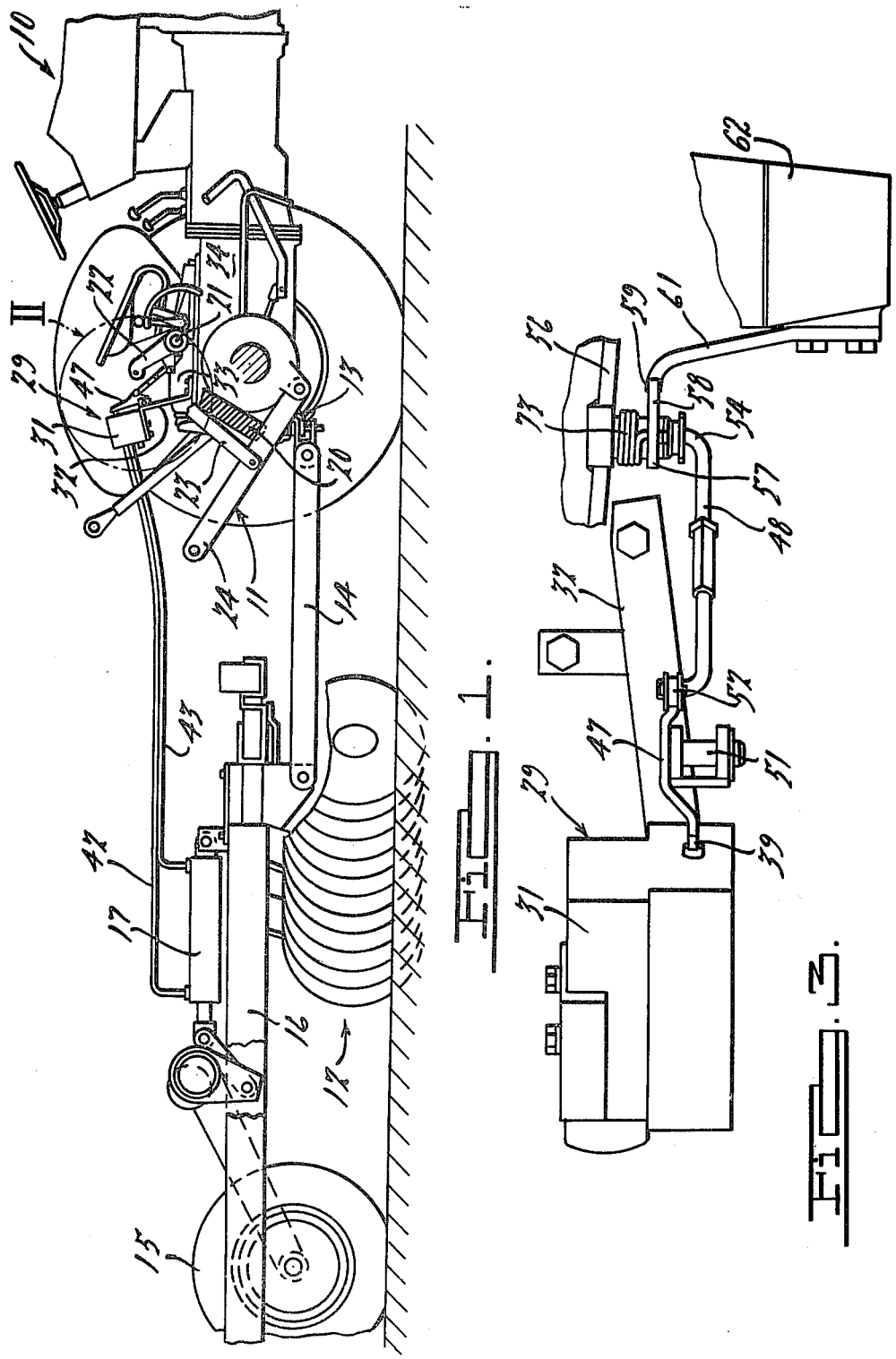
FIG. 1 is a side elevation of a tractor and a semimounted soil working implement, portions of the tractor and implement being broken away.

Referring now to the drawings, a tractor 10 is provided with a liftable implement supporting hitch 11 and a hydraulic system for raising and lowering the hitch. The implement 12, which in this instance is shown as a semimounted disc type harrow, is attached by a tongue 13 to a drawbar 14 secured to the tractor for towing the implement. The implement 12 is provided with one or more gauge wheels 15 which are adapted to at least partially support the implement and regulate the degree of penetration of the harrow below the surface of the ground, thus determining the load on the tractor (towing force required). The gauge wheels are mounted for raising and lowering movement relative to the frame 16 of the harrow, the height of the gauge wheels being controlled by a double acting hydraulic cylinder 17.

Figure 4:
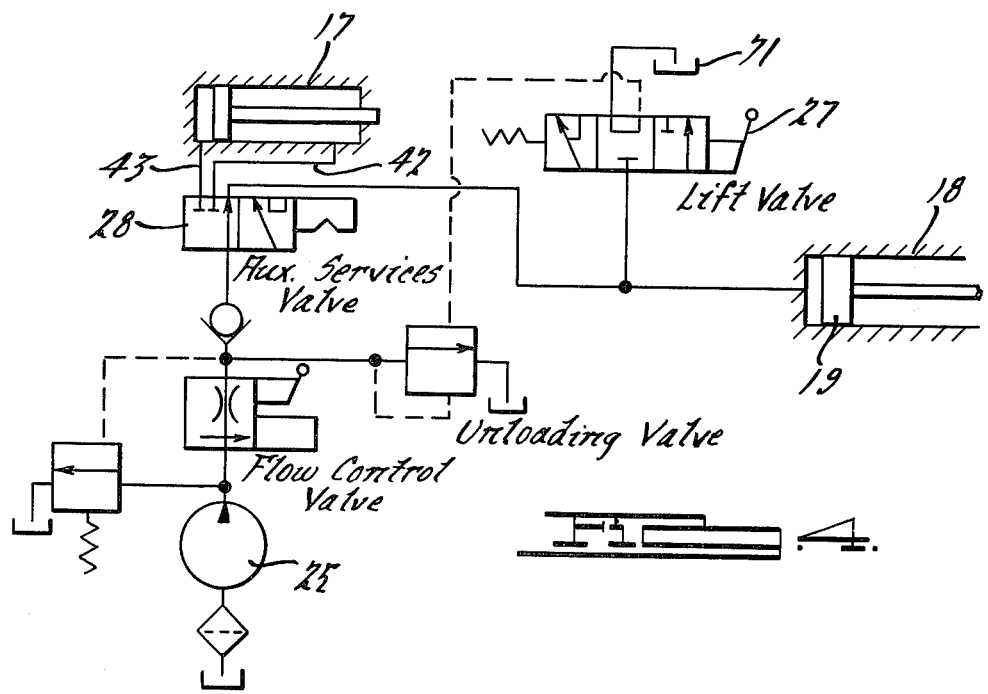
FIG. 4 is a hydraulic circuit diagram of a current hydraulic system for operating a remote cylinder and a hydraulic power lift cylinder for raising and lowering a soil working implement.

The basic mechanism and hydraulic system for raising and lowering the liftable implement supporting hitch is more or less conventional and has been used for a number of years in the well known Ford tractors. The mechanism is illustrated and explained in the aforementioned U.S. Pat. No. 3,753,467 and is shown schematically herein in FIG. 4. The tractor 10 is provided with a lift cylinder 18 that is a single acting cylinder. A piston 19 within the cylinder 18 is linked by a ram arm and a connecting rod to a rockshaft 21 rotatably mounted on the tractor. By means of well known linkage, including lift arms 22 mounted on the rockshaft 21 and lift links 23 extending downwardly from the lift arms 22 and connected to draft links 24, the tractor hitch may be raised and lowered.

The tractor lift cylinder 18 is operated by a hydraulic fluid pressurized by a hydraulic pump 25. A lift valve 26, which preferably is of the spool valve type, regulates the flow of fluid to and from the lift cylinder. Flow of fluid to the cylinder 18 serves to raise the tractor hitch 11; release of fluid from the cylinder 18 permits the cylinder piston 19 to move to the left, as viewed in FIG. 4, and permits the tractor hitch to lower. In order to assure lowering of the hitch, a spring 20 extending between on one of the lift arms 22 and a portion of the tractor may be provided to continually bias the hitch downwardly. The hydraulic system described is more or less conventional and has been used for a number of years in tractors manufactured by the Ford Motor Company.

The implement hydraulic cylinder 17 and the lift cylinder 18 are interconnected for simultaneous operation. Any movement of the lift control lever 27 (FIG. 4) that actuates the lift valve 26 to raise or lower the tractor hitch 11 also extends or retracts the remote cylinder 17 to raise or lower the rear end of the implement 12 simultaneously with the raising or lowering of the front end by the tractor hitch.

A flow control valve 30 is responsive to tractor driveline torque as described in U.S. Pat. No. 3,575,241. The driveline torque sensing unit (not shown) is adapted to send a signal to the control valve 30 to cause the latter to change the height of the lift arms. Because of the interconnection between the implement hydraulic lift cylinder 17 and hitch lift cylinder 18, the change in height of the hitch is reflected in a change in height of the rear end of the implement 12. The result is that the signal to the control valve changes the height of the lift arms which changes the working depth of the implement to compensate for changes in draft loads.

When the tractor operator desires to use the current tractor driveline torque sensing unit when pulling a semi-mounted or trailed implement, he must first engage an auxiliary services valve 28 (FIG. 4) which directs pump oil to the remote cylinder 17. Return oil from the remote cylinder is directed to the hydraulic power lift cylinder 18, hence raising the implement by simultaneously extending both cylinders.

The current system in the field today has three major concerns which are detrimental to the farmer and the manufacturer. The first concern is the requirement of a complex series of manipulations of the controls in a predetermined sequence to phase the remote cylinder 17 with the lift cylinder 18, initially and during normal operations. The necessity for phasing the cylinders arises from either cylinder leaking down and getting out of phase with the other.

The second concern is the requirement of a special size remote cylinder 17 that must be provided to the tractor customer. The special cylinder must match the volume of the lift cylinder 18 and must have a piston having a valve therein that opens at the end of a cylinder stroke to allow oil transfer to the lift cylinder.

The third concern arises from the accidental overheating of the hydraulic system when the operator disconnects the remote cylinder and forgets to shift the auxiliary services valve to a position that permits return flow of oil to the lift cylinder 18.

With respect to the first concern, the implement is properly phased with the tractor when the implement is raised to full height and its rear end reaches full height slightly before its front or hitch 11 mounted end. If this does not occur, the remote cylinder 17 is said to be out of phase with the lift cylinder 18. To properly phase the cylinders, the tractor operator must, with the current system, shut off all fluid flow to the auxiliary services valve and then move the hitch lift control lever 27 to a hitch fully lowered position. When the tractor hitch lift links 24 are fully lowered, the operator must open the auxiliary services valve to fluid under pressure and then move the hitch lift control lever 27 to a hitch fully raised position. This causes the implement to be fully raised with its rear end reaching the fully raised position before the front end because of the unique valve-in-piston used in the remote cylinder.

The present invention provides for the automatic phasing of the cylinders, the elimination of the auxiliary services valve manipulation by the operator, and the use of a standard remote cylinder in place of the "unique" remote cylinder with its "valve-in-piston" arrangement. As will be further explained, the third concern relating to the accidental overheating of the hydraulic system also is eliminated. The elimination of these concerns is accomplished by the provision of a phasing valve, generally designated 29, operating off the hitch lift arms 22. With the phasing valve 29, no special phasing manipulations by the operator are required either initially or during normal operation. A full raise signal by the operator will automatically phase both cylinders every time the lift control lever is moved to a full lift position.

Figure 2:
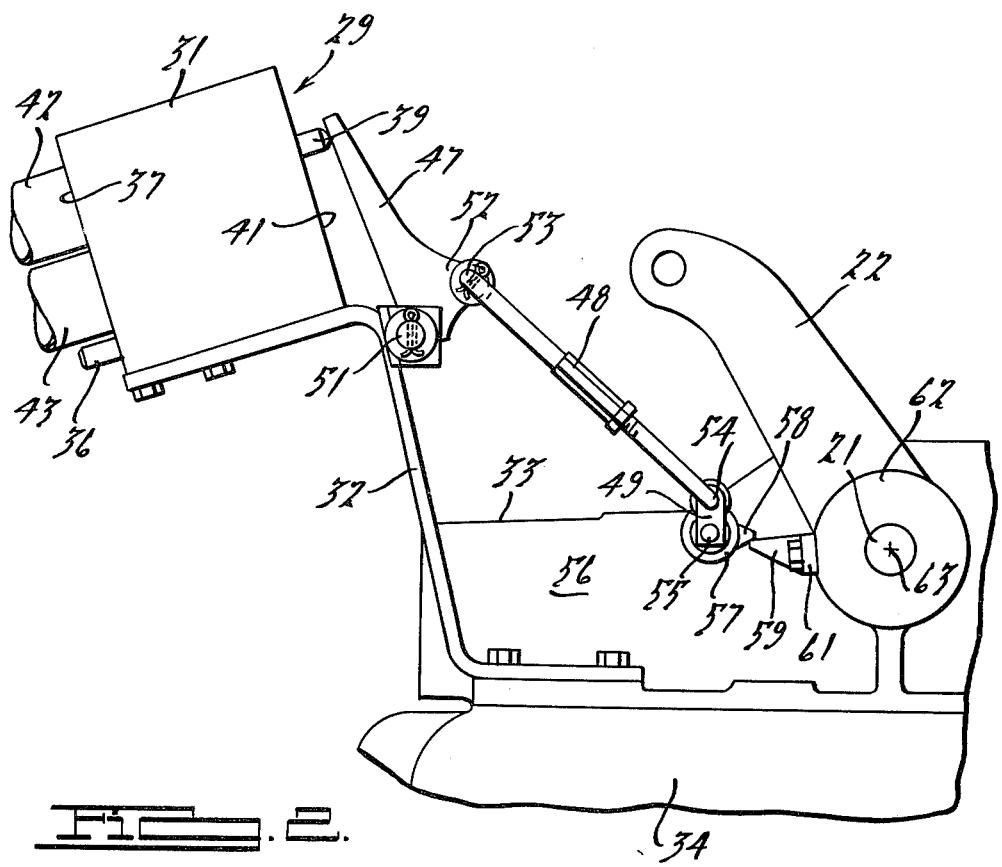
FIG. 2 is an enlarged view taken within the circle 2 in FIG. 1.

Referring now to FIG. 2, the phasing valve 29 comprises a valve body 31 supported on a bracket 32 mounted on the cover 33 of the center housing 34 of the rear axle of the tractor. As shown in greater detail in FIGS. 5, 6 and 7, the valve body 31 is provided with a plurality of oil passageways, several of which accommodate valve spools. The two most important valve spools with reference to the present invention are the auxiliary services valve spool 35 having a stem portion 36 projecting outwardly of the right side 37 of the valve body 31, as viewed in FIG. 5, and the phasing valve spool 38 having a stem portion 39 projecting outwardly of the left side 41 of the valve body 31.

The operation of the phasing valve 29 may best be understood with reference to two operational modes, the first of which is illustrated in FIG. 6. This represents a condition in which the remote cylinder 17 is not coupled to the valve body 31 by conduits or hose connections 42 and 43 and the auxiliary service valves 35 is in an unshifted position to the right. When a hitch 11 raise signal is initiated by the operator by manipulation of lift lever 27, flow from pump 25 is directed to the power lift cylinder 18 through oil inlet passage 44 to oil outlet passage 45 through spool passage 46 of the auxiliary services valve 35.

When the lift cylinder 18 has moved to a point at which the hitch 11 has reached a predetermined height, such as two inches (five centimeters) from maximum height, phasing valve spool 38 is shifted to the right by lever 47, link 48 and lever 49.

As best seen in FIG. 2, the lever 47 is pivotally mounted on a shaft 51 supported on the bracket 32. The lever 47 is pivotally coupled at its lower end 52 to the upper end 53 of link 48. The lower end 54 of the link 48 is pivotally coupled to the lever 49, the lower end of which is pivotal about a shaft 55 supported on the side wall 56 of the center housing 34 of the tractor axle. The lower end of lever 49 is fixed to a disk 57 having a radially extending projection 58 over the end 59 of an arm 61 mounted on the hub 62 of and swingable with the lift arm 22. As shown In FIG. 2, clockwise movement of the lift arm 22 about its pivot axis 63 results in counter-clockwise movement of the lever 47, causing the latter to abut the stem portion 39 of the phasing valve, causing the latter to move to the right as viewed in FIGS. 5 and 6. This has no effect, however, on pump flow which continues to be directed to the hydraulic lift cylinder 18 until the lift arms reach the full lift height and pump flow is stopped by the flow control valve inside the center housing 34.

In the second operational mode of the phasing valve of interest, reference being made to FIG. 5, both hitch lift 11 and remote cylinder 17 are in operation. A male coupler (not shown) on the conduit or hose 42 has an integral disk which engages the projecting end of the stem 36 of the auxiliary services valve 35 as the coupler is locked on the threaded fitting 64a on the valve body 31. This results in the auxiliary service valve spool 35 being shifted to the left. In this mode, passage 44 is connected to passage 65 through spool passage 46. When a raise signal is initiated by the operator, pump flow passes through passages 44, 46 and 65 and then through hose 42 to the remote cylinder 17.

Return oil from the remote cylinder 17 passes through the hose 43 to where it is coupled to fitting 64b on the valve body 31. From fitting 64b it finds its way through passage 66 into phasing valve spool 38, passageway 67 to passage 68, and then to the lift cylinder 18, causing the latter to raise the hitch 11. When the hitch 11 is approximately two inches (five centimeters) from maximum height, the phasing valve spool 38 is shifted, as viewed in FIG. 5, to the right. This is caused by lever 47 responding to the position of the lift arm 22 and exerting pressure on the stem 39 of the valve spool 38.

The shifting of the valve spool 38 causes passage 66 to be connected to passage 69 through spool valve passage 67. Oil flow from passage 69 is discharged into tank or reservoir 71. Passage 68 is blocked by phase valve spool 38 and as a result the lift cylinder 18 stops extending. The remote cylinder 17 continues, however, to extend until it reaches the end of its stroke. When the remote cylinder reaches the end of its stroke, pump pressure in passage 44 rises to 2200 psi, as controlled by spring 72, and shifts relief valve 73 to the right connecting passage 44 to 68. Pump flow is then directed to the hitch lift cylinder 18 to complete the extension of the latter's stroke. Valve spool 38 automatically shifts to the left as soon as the hitch lift cylinder 18 continues its extension because the lever 47 is returned to a neutral position by a torsional spring 74 acting through lever 49 and link 48 on lever 47 to swing the latter in a clockwise direction as viewed in FIG. 2.

The advantage of the described phasing valve is the simplicity of bringing the two cylinders 17 and 18 into phase with each other. For example, if the tractor operator notices that the remote cylinder 17 is out of phase with and lagging the lift cylinder 18, he need only operate the lift control lever 27 to bring the hitch to fully raised position. The lift cylinder 18 will stop when the hitch reaches a position two inches (five centimeters) from maximum height, the remote cylinder 17 will continue its extension until the rear end of the implement is raised to its full height, and the lift cylinder will continue its extension, bringing the hitch to full height and the system is then in phase again.

If the operator notices that the remote cylinder 17 is out of phase with and preceding the lift cylinder 18, actuation of the lift lever 27 will cause the remote cylinder to extend to full raise position of the implement rear end. After the remote cylinder is fully extended, the hitch lift cylinder will fully extend and both cylinders again will be in phase.

Disconnection of the hose coupler from the phasing valve body 31 also permits the auxiliary services valve spool biased by spring 75 to automatically move back to the FIG. 6 position, as explained with reference to the first operational mode. The pump output is merely recirculated through the tractor hydraulic system. The operator cannot forget to shift the automatic services valve as may happen with current systems in use. In current systems, failure to move the auxiliary control valve to an "off" position when disconnecting the remote cylinder may result in continuous high pressure oil flow through the hydraulic system pressure relief valve. This cannot occur with the system of this invention.

It is to be understood that this invention is not limited to the exact construction illustrated and described above, but that various changes and modifications may be made without departing from the spirit and scope of the invention as defined in the appended claims.

I claim:

1. In combination, a tractor and a soil working implement coupled thereto;

the tractor at its one end having an implement hitch and a hydraulic lift means including lift arm means for raising and lowering the hitch;

the implement being coupled at its one end to the hitch means and being supported at its other end on a hydraulically adjustable height controlling means;

the hydraulically adjustable height controlling means having a hydraulic cylinder connected in series with a hydraulic cylinder of the hydraulic lift means such that both cylinders extend or retract to synchronously raise both ends of the implement means in predetermined relationship to each other;

a source of fluid under pressure;

a phasing valve means for controlling the fluid flow to the cylinders;

a lever and linkage mechanism interposed between the phasing valve and the lift arm means and operatively connected for movement in response to movement of the lift arm means; and the phasing valve means including a valve body and an actuating stem portion extending out of the valve body, said actuating stem portion being engaged by the lever and linkage mechanism when the lift arm means attains a given position while raising the hitch for automatically phasing the cylinders any time a full raise signal to the hydraulic lift means is initiated by the tractor operator.

2. In combination, a tractor and a soil working implement coupled thereto;

the tractor having at its rear end an implement hitch and a lift means including lift arm means carried on the tractor and operatively connected for raising and lowering said hitch;

the implement being coupled at one end to said hitch and at its other end being supported on height adjusting means;

the lift means and the height controlling means each including a hydraulic cylinder means to raise or lower, respectively, the hitch and the rear end of the implement;

a source of fluid under pressure;

a valve system comprising a plurality of valve means in communication with one another;

one of said valve means including an auxiliary services valve having a valve spool positionable in a first position for directing fluid from a fluid input passageway connected to the source of fluid to a first output passageway connected to a lift valve for controlling fluid flow to the lift means hydraulic cylinder;

a second one of said valve means including a phasing valve having a valve body and a valve spool including an actuating stem portion extending out of said valve body for automatically causing both cylinders to be restored to a predetermined initial position upon a full raise signal to the hydraulic lift means being initiated by the tractor operator; and a lever member mounted adjacent the phasing valve spool for engagement therewith and operatively connected to linkage means mounted for engagement with a portion of said lift arm, movement of said lift arm to said full raise position causing said lift arm to engage said linkage means, which causes said lever member to engage said phasing valve spool stem portion, thus effecting movement of said phasing valve spool to a position permitting said cylinder restoration.

3. In combination according to claim 2, in which:

the valve spool of said one valve means is positionable in a second position for directing fluid from said fluid input passageway to a second fluid output passageway;

conduit means disengageably connect the hydraulic cylinder means of the implement height adjusting means to the second fluid output passageway;

and a valve spool shifting means is operative to hold said valve spool in said second position against the resistance of a biasing means while the conduit means is connected to the second fluid output passageway.

4. In combination according to claim 2, in which:

said second valve means valve spool controlling the flow of fluid to the hydraulic cylinder means for raising the rear end of the implement in synchronism with the raising of the hitch supported end.

* * * * *